US009164351B2

(12) United States Patent
Bohn

(10) Patent No.: US 9,164,351 B2
(45) Date of Patent: Oct. 20, 2015

(54) FREEFORM-PRISM EYEPIECE WITH ILLUMINATION WAVEGUIDE

(71) Applicant: Microsoft Technology Licensing, LLC, Redmond, WA (US)

(72) Inventor: David D. Bohn, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/625,498

(22) Filed: Feb. 18, 2015

(65) Prior Publication Data

US 2015/0168802 A1   Jun. 18, 2015

Related U.S. Application Data

(63) Continuation of application No. 13/426,371, filed on Mar. 21, 2012, now Pat. No. 8,985,803.

(51) Int. Cl.
G02B 27/01    (2006.01)
G06F 3/01     (2006.01)
G02F 1/29     (2006.01)
G02F 1/313    (2006.01)
G02F 1/1335   (2006.01)

(52) U.S. Cl.
CPC ............ *G02F 1/292* (2013.01); *G02B 27/0101* (2013.01); *G02B 27/0172* (2013.01); *G02F 1/133504* (2013.01); *G02F 1/133524* (2013.01); *G02F 1/133621* (2013.01); *G02F 1/313* (2013.01); *G02B 2027/0112* (2013.01); *G02F 2001/133622* (2013.01)

(58) Field of Classification Search
CPC ..................... B29D 11/00663; G02B 17/0856; G02B 2027/0178; G02B 25/001; G02B 6/0016; G02B 6/0055; G02B 6/0076

USPC ........................................... 362/109, 611, 612
See application file for complete search history.

(56) References Cited

U.S. PATENT DOCUMENTS 6,181,475 B1   1/2001   Togino et al.
7,307,791 B2   12/2007  Li et al.
(Continued)

FOREIGN PATENT DOCUMENTS

EP    1202104 A1    5/2002
JP    H09218375 A   8/1997

OTHER PUBLICATIONS

Zhang, et al., "Design of a Polarized Head-Mounted Projection Display Using Ferroelectric Liquid-Crystal-On-Silicon Microdisplays", Retrieved at <<http://www.u.arizona.edu/~zrui3/Design%20of%20pHMPD_AO08.pdf>> Appl. Opt., vol. 47, No. 15, Apr. 7, 2008, pp. 2888-2896.

(Continued)

*Primary Examiner* — Tracie Y Green
(74) *Attorney, Agent, or Firm* — Jeremy Snodgrass; Judy Yee; Micky Minhas

(57) ABSTRACT

An imaging panel includes a light source, a reflective image-forming array, and a freeform-prism eyepiece. The light source includes a light emitter and a waveguide having a grating. The waveguide is configured to confine the light from the light emitter and to release the light through the grating. The reflective image-forming array is configured to form a display image using light from the light source and to reflect the display image back through the waveguide. The freeform-prism eyepiece configured to receive the display image and to present the display image for viewing, together with an external image transmitted through the eyepiece.

20 Claims, 5 Drawing Sheets

(56) References Cited

U.S. PATENT DOCUMENTS

| 7,798,698 | B2 | 9/2010 | Segawa |
|---|---|---|---|
| 2003/0179998 | A1 | 9/2003 | Zhang et al. |
| 2006/0198027 | A1 | 9/2006 | Li et al. |
| 2007/0052929 | A1 | 3/2007 | Allman et al. |
| 2008/0205081 | A1 | 8/2008 | Ijzerman et al. |
| 2010/0103078 | A1 | 4/2010 | Mukawa et al. |
| 2010/0164840 | A1 | 7/2010 | Yamamoto |
| 2011/0002143 | A1 | 1/2011 | Saarikko et al. |

OTHER PUBLICATIONS

"DigiLens Makes Light Work for Athletes", Retrieved at <<http://www.theengineer.co.uk/news/digilens-makes-light-work-for-athletes/286715.article>> Aug. 22, 2000, p. 1.

"LCOS Microdisplay Components", Retrieved at <<http://www.holoeye.corn/lcos_microdisplays.html>> Retrieved Date: Dec. 6, 2011, p. 1.

Korean Intellectual Property Office, International Search Report and Written Opinion of PCT/US2013/030228, WIPO, Jun. 26, 2013, 9 pages.

Yamazaki, et al., "A Thin, Wide Field-of-view HMD with Free-Form-Surface Prism and Applications", Retrieved at <<http://spiedigitallibrary.org/proceedings/resource/2/psisdg/3639/1/453_1?isAuthorized=no>>, Part of the IS&T/SPIE Conference on The Engineering Reality, SPIE, vol. 3639, Jan. 1999, pp. 453-462.

Cheng, et al., "Design of an optical see-through head-mounted display with a low f-number and large field of view using a freeform prism", Retrieved at <<http://www.opticsinfobase.org/ao/abstract.cfm?uri=ao-48-14-2655>>, Applied Optics, vol. 48, No. 14, May 10, 2009, pp. 2655-2668.

"SBG Labs", Retrieved at <<http://www.sbglabs.com/>>, Retrieved Date: Mar. 23, 2012, pp. 3.

FREEFORM-PRISM EYEPIECE WITH ILLUMINATION WAVEGUIDE

CROSS REFERENCE TO RELATED APPLICATIONS

This application is a continuation of U.S. patent application Ser. No. 13/426,371, filed on Mar. 21, 2012, and titled "FREEFORM-PRISM EYEPIECE WITH ILLUMINATION WAVEGUIDE" the entire disclosure of which is hereby incorporated herein by reference.

BACKGROUND

A head-mounted display (HMD) device is a mobile, wearable, computer or video monitor that presents display imagery privately to its wearer. An HMD device may include an eyepiece for guiding a virtual display image into the wearer's field of view. Typically, the display image is formed on an emissive array, such as an organic light-emitting diode (OLED) array, or on a backlit, transmissive liquid-crystal display (LCD) array. In the current state of the art, transmissive LCD arrays exhibit significant radiant-energy losses, which may reduce battery life in an HMD device. OLED arrays are more efficient, but may not provide suitable output luminance, especially when the HMD device is used in an augmented-reality (AR) mode, where computer-generated virtual imagery is combined with real imagery from the outside world.

SUMMARY

One embodiment of this disclosure provides an imaging panel. The imaging panel includes a light source, a reflective image-forming array, and a freeform-prism eyepiece. The light source includes a light emitter and a waveguide having a grating. The waveguide is configured to confine the light from the light emitter and to release the light through the grating. The reflective image-forming array is configured to form a display image using light from the light source and to reflect the display image back through the waveguide. The freeform-prism eyepiece is configured to receive the display image and to present the display image for viewing, together with an external image transmitted through the eyepiece.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
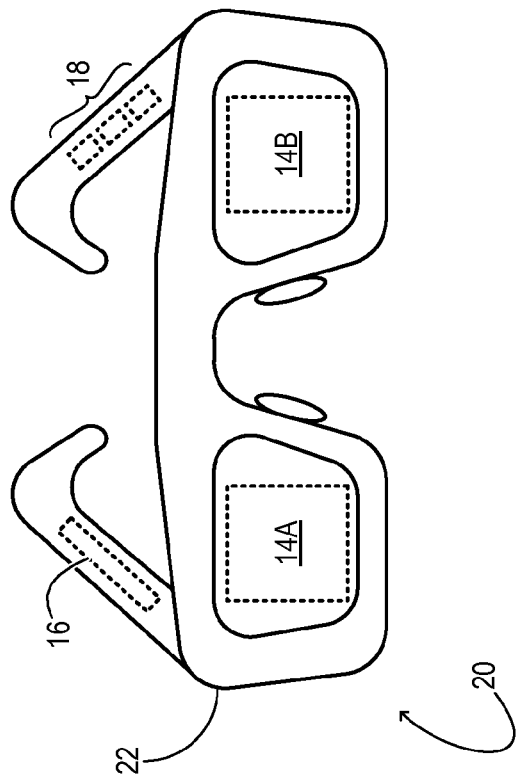
FIGS. 1 and 2 show example HMD devices in accordance with embodiments of this disclosure.

Aspects of this disclosure will now be described by example and with reference to the illustrated embodiments listed above. Components that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows an example HMD device 10 in one embodiment. HMD device 10 is a helmet having a visor 12. Between the visor and each of the wearer's eyes is arranged an imaging panel 14: imaging panel 14A is arranged in front of the right eye; imaging panel 14B is arranged in front of the left eye. The HMD device also includes controller 16 and sensors 18. The controller is a microcomputer operatively coupled to both imaging panels and to the sensors.

Sensors 18 may be arranged in any suitable location in HMD device 10. They may include a gyroscope or other inertial sensor, a global-positioning system (GPS) receiver, and/or a barometric pressure sensor configured for altimetry. These sensors may provide data on the wearer's location or orientation. From the integrated responses of the sensors, controller 16 may track the movement of the HMD device within the wearer's environment.

In one embodiment, sensors 18 may include an eye-tracker—i.e., a sensor configured to detect an ocular state of the wearer of HMD device 10. The eye tracker may locate a line of sight of the wearer, measure an extent of iris closure, etc. If two eye trackers are included, one for each eye, then the two may be used together to determine the wearer's focal plane based on the point of convergence of the lines of sight of the wearer's left and right eyes. This information may be used for placement of a computer-generated display image, for example.

In the illustrated embodiment, each imaging panel 14 is at least partly transparent, to provide a substantially unobstructed field of view in which the wearer can directly observe his physical surroundings. Each imaging panel is configured to present, in the same field of view, a computer-generated display image. Controller 16 may control the internal componentry of imaging panels 14A and 14B in order to form the desired display images. In one embodiment, controller 16 may cause imaging panels 14A and 14B to display the same image concurrently, so that the wearer's right and left eyes receive the same image at the same time. In another embodiment, the imaging panels may project somewhat different images concurrently, so that the wearer perceives a stereoscopic, i.e., three-dimensional image. In one scenario, the computer-generated display image and various real images of objects sighted through an imaging panel may occupy different focal planes. Accordingly, the wearer observing a real-world object may have to shift his or her corneal focus in order to resolve the display image. In other scenarios, the display image and at least one real image may share a common focal plane.

In the HMD devices disclosed herein, an imaging panel 14 may also be configured to acquire video of the surroundings sighted by the wearer. The video may include depth video. It may be used to establish the wearer's location, what the wearer sees, etc. The video acquired by the imaging panel may be received in controller 16, and the controller may be configured to process the video received. To this end, imaging panel 14 may include a camera. The optical axis of the camera may be aligned parallel to a line of sight of the wearer of the HMD device, such that the camera acquires video of the external imagery sighted by the wearer. The video acquired may comprise a time-resolved sequence of images of spatial resolution and frame rate suitable for the purposes set forth herein. As the HMD device may include two imaging panels—one for each eye—it may also include two cameras. More generally, the nature and number of the cameras may differ in the various embodiments of this disclosure. One or more cameras may be configured to provide video from which a time-resolved sequence of three-dimensional depth maps is obtained via downstream processing.

Figure 2:
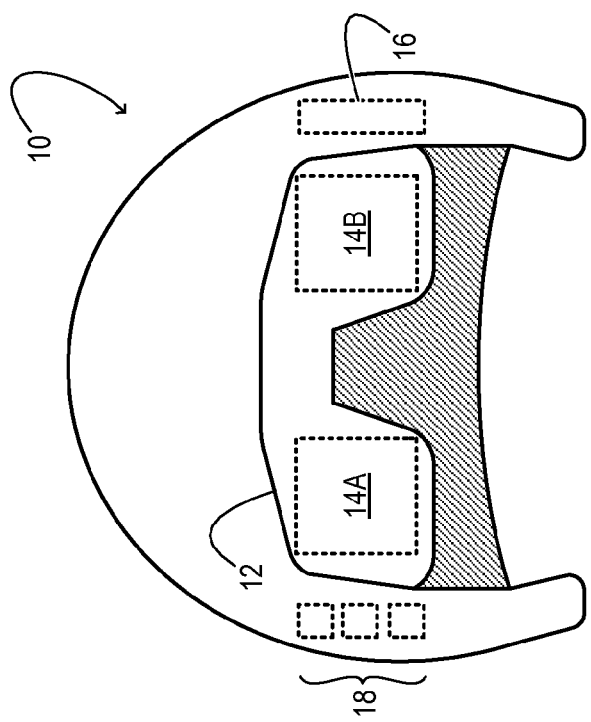

FIG. 2 shows another example HMD device 20. HMD device 20 may closely resemble an ordinary pair of eyeglasses or sunglasses, but it too includes imaging panels 14A and 14B. HMD device 20 also includes wearable mount 22, which positions the imaging panels a short distance in front of the wearer's eyes. In the embodiment of FIG. 2, the wearable mount takes the form of conventional eyeglass frames.

No aspect of FIG. 1 or 2 is intended to be limiting in any sense, for numerous variants are contemplated as well. In some embodiments, for example, a vision system separate from imaging panels 14 may be used to acquire video of what the wearer sees. In some embodiments, a binocular imaging panel extending over both eyes may be used instead of the monocular imaging panel shown in the drawings. Likewise, an HMD device may include a binocular eye tracker. In some embodiments, an eye tracker and imaging panel may be integrated together, and may share one or more optics.

The HMD devices disclosed herein may be used to support a virtual-reality (VR) or augmented-reality (AR) environment for one or more participants. A realistic AR experience may be achieved with each AR participant viewing his environment naturally, through passive optics of the HMD device. Computer-generated imagery, meanwhile, may be projected into the same field of view in which the real-world imagery is received. Imagery from both sources may appear to share the same physical space. Furthermore, the controller in the HMD device may be configured to run one or more computer programs that support the VR or AR environment. In some embodiments, some computer programs may run on an HMD device, and others may run on an external computer accessible to the HMD device via one or more wired or wireless communication links. Accordingly, the HMD device may include suitable wireless componentry, such as Wi-Fi.

Figure 3:
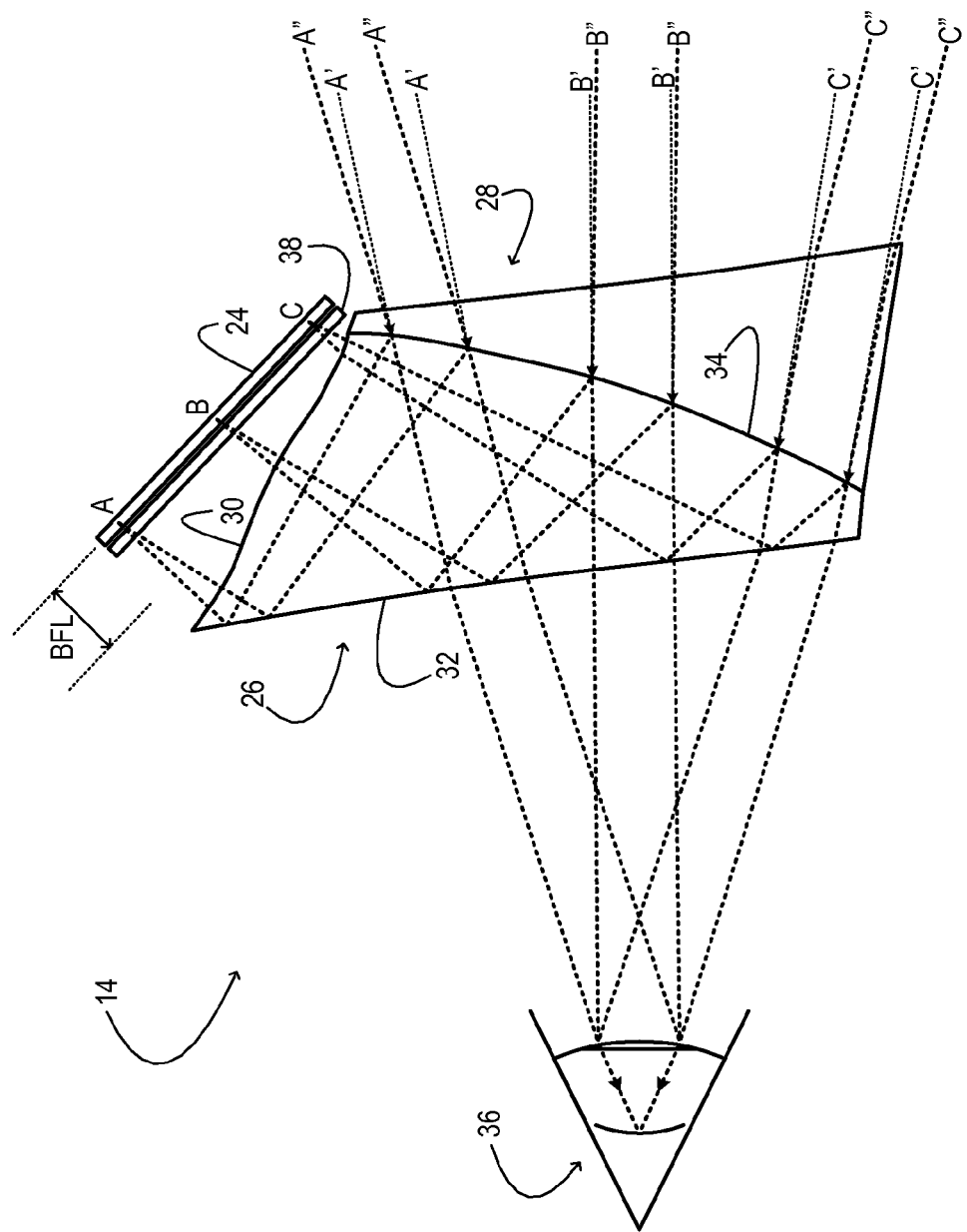
FIG. 3 shows aspects of an example imaging panel in cross section in accordance with an embodiment of this disclosure.

FIG. 3 shows aspects of imaging panel 14 in one embodiment. In particular, the drawing shows image-forming array 24, freeform-prism eyepiece 26, and compensator 28. The image-forming array is configured to form the display image presented to the wearer of the HMD device. Controller 16 is configured to provide control signals to the image-forming array so that the desired display image is formed. The freeform-prism eyepiece is configured to receive the display image and to present the display image for viewing, together with an external image transmitted through the eyepiece. The external image may originate from real-world imagery external to the HMD device. The compensator adjusts the vergence of the external image so that, after passing through the freeform-prism eyepiece, the external image emerges undistorted.

FIG. 3 shows light rays of the display image diverging from three example loci—A, B, and C—of image-forming array 24. The rays enter entry face 30 of freeform-prism eyepiece 26 and are totally internally reflected from front face 32 and from back face 34. The rays then exit the eyepiece through the front face and converge at 36, on the wearer's retina. In the illustrated embodiment, light rays diverging from the array at A, B, and C contribute to a virtual image positioned at infinity and originating apparently from corresponding directions A', B', and C'.

Meanwhile, light rays from external imagery sighted by the wearer of the HMD device—from A", B", and C", for example—are refracted first through compensator 28 and then through freeform-prism eyepiece 26. These optics apply an equal but opposite deflection to the light rays, such that they arrive at the wearer's eye with no net change in vergence. In some embodiments, the freeform-prism eyepiece may be separated from the compensator at back face 34. An air gap or thin layer of low refractive-index material may be used to decouple the two optics and thereby promote total internal reflection of the display image at back face 34.

Continuing in FIG. 3, it is desirable for freeform-prism eyepiece 26 to cover a significant portion of the field of view of the HMD-device wearer, and to be relatively thin. These requirements, together with the size of the image-forming array, constrain both the focal length and the back focal length (BFL) of the optic. In particular, when a freeform-prism eyepiece of suitable dimensions is used with a small, low-cost image-forming array, the resulting BFL may be relatively short, as shown in FIG. 3.

One consequence of the short BFL is that image-forming array 24 must be positioned very close to entry face 30 of freeform-prism eyepiece 26. Unfortunately, this constraint discourages the use of reflective image-forming arrays and favors self-emissive (e.g., OLED) arrays and backlit, transmissive arrays. However, reflective image-forming array technology currently provides a brighter display image than OLED technology and is more energy efficient than backlit, transmissive LCD technology. In particular, reflective liquid-crystal on silicon (LCOS) and digital micromirror device (DMD) technologies provide outstanding brightness and energy efficiency. Brightness is especially important when the HMD device is to be used in AR mode, where the display image may be viewed against a background of sunlit, real imagery. Energy efficiency is desirable for any electronic device, and particularly for battery-powered devices.

To address these issues, the present disclosure provides a novel configuration that combines a reflective image-forming array with a compact light source suited to illuminate the array. Thus, image-forming array 24 of FIG. 3 may be a reflective array. In one embodiment, the image-forming array may be an LCOS array in which polarization-rotating liquid-crystal is situated on a rectangular array of passivated, highly-reflective pixel elements. The elements themselves may be fabricated on a silicon chip, which electrically addresses each of the elements, causing them to rotate the polarization plane of the light reflected therefrom. Since light is received in and reflected back from the array through a polarizing filter, rotation of the polarization plane at a pixel element decreases the transmission efficiency of the light reflected from that element, causing the corresponding pixel to appear darker with increasing rotation.

In another embodiment, image-forming array 24 may be a DMD array in which an individually deflectable mirror element is provided for each pixel of the display image. In the fully ON state of a pixel, the mirror element may be deflected such that the light incident on that element is reflected into freeform-prism eyepiece 26; in the fully OFF state, the mirror element may be deflected such that the incident light is reflected away from the freeform-prism eyepiece. In intermediate states of the pixel, the mirror element may be toggled rapidly between fully ON and fully OFF positions, the brightness of the pixel determined by the duty cycle of the periodic mirror deflection.

In these and other embodiments, a color display image may be formed by illuminating the image-forming array with red, green, and blue light in rapid succession, while modulating the brightness of each pixel in synchronicity with the changing illumination color. Accordingly, imaging panel 14 of FIG. 3 includes light source 38. The light source may be positioned directly in front of image-forming array 24, in the narrow space between the array and freeform-prism eyepiece 26. As described in further detail below, the light source includes at least one waveguide from which light is released to illuminate the image-forming array. The waveguide may be arranged parallel to and stacked upon the image-forming array, as shown in FIG. 3. In the embodiments considered herein, each waveguide is substantially transparent to the display image, which allows the display image to be reflected back through the waveguide en route to the freeform-prism eyepiece.

Figure 4:
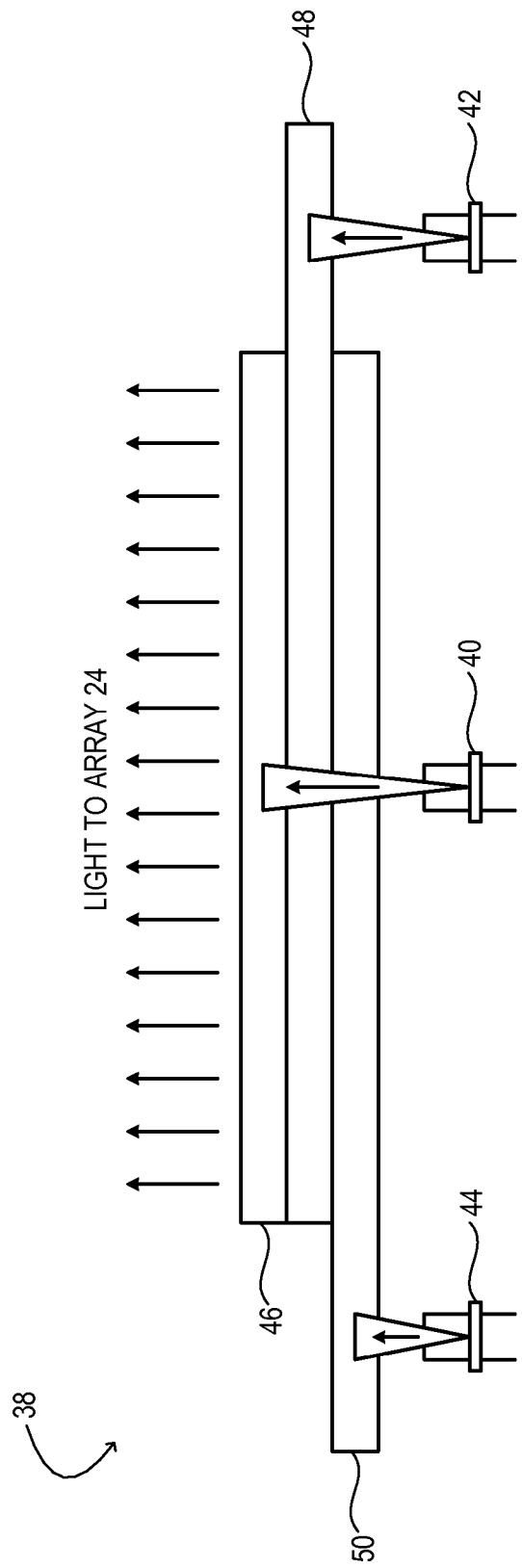
FIG. 4 shows aspects of an example light source in cross section in accordance with an embodiment of this disclosure.
Figure 5:
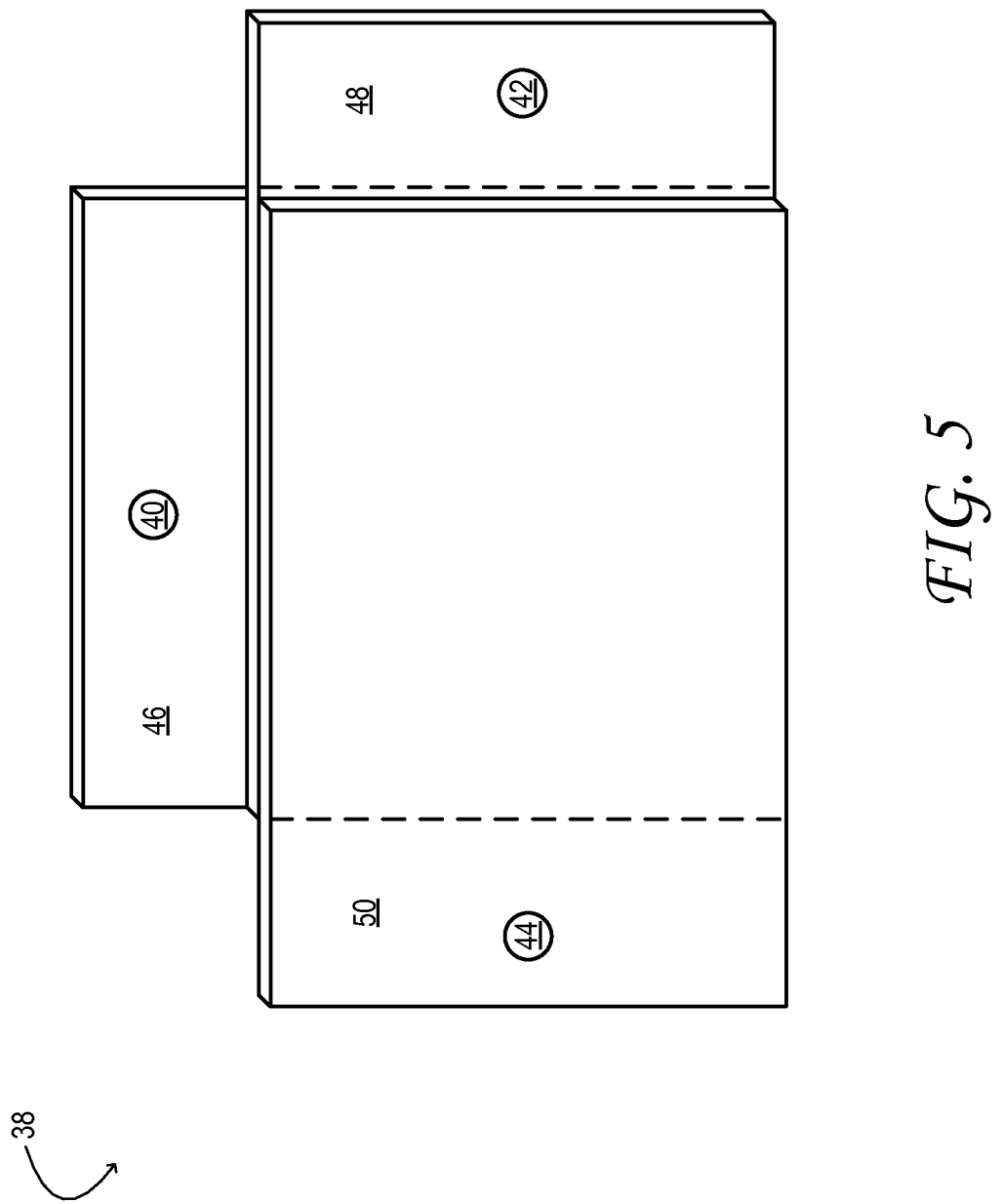
FIG. 5 shows aspects of an example light source in plan in accordance with an embodiment of this disclosure.

FIGS. 4 and 5 show aspects of light source 38 in greater detail. The illustrated light source includes three light emitters—red-emitting laser 40, green-emitting laser 42, and blue-emitting laser 44. Each of the red-, green-, and blue-emitting lasers may be a low-profile laser diode, for example. The spectral bandwidth of each of the light emitters may be ten nanometers or less—two to five nanometers in some examples. In some embodiments, the red-emitting laser, the blue-emitting laser, and the green-emitting laser are configured to emit in sequence—e.g., to cycle from red to green to blue light, over and over again. In one embodiment, the emission may be cycled at 540 Hertz or more.

Light source 38 also includes planar waveguides 46, 48, and 50, which are stacked parallel to each other. In one embodiment, the waveguides may be identical in size and shape, but differ in their grating structure, as further described below. In the illustrated embodiment, the waveguides are stacked to define a significant area of overlap, while exposing a relatively small end section where a corresponding light emitter is coupled. In the illustrated embodiment, red-emitting laser 40 is coupled to waveguide 46, green-emitting laser 42 is coupled to waveguide 48, and blue-emitting laser 44 is coupled to waveguide 50. In one embodiment, the combined thickness of the three waveguides may be one millimeter or less.

Figure 6:
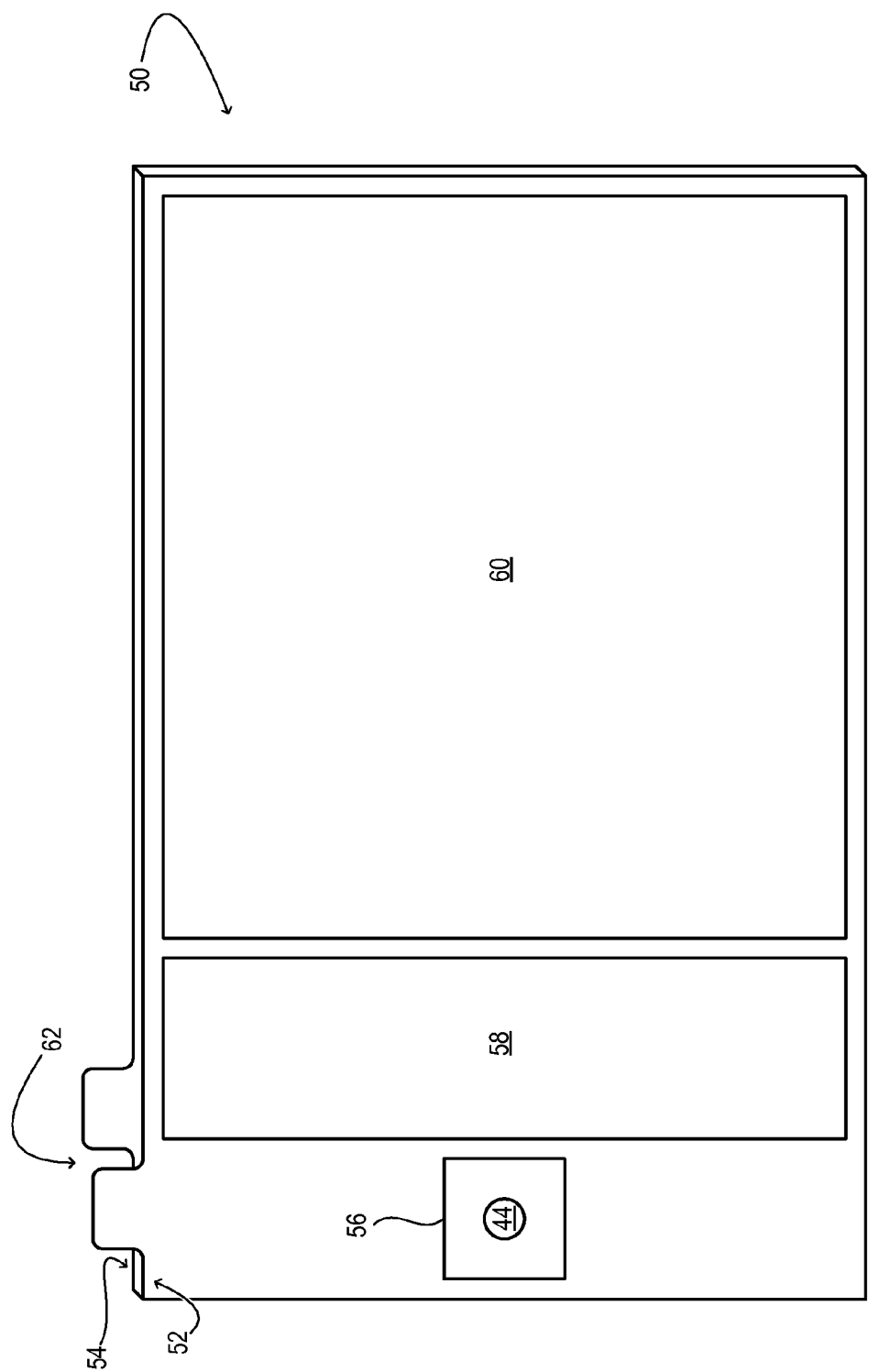
FIG. 6 shows aspects of an example waveguide in accordance with an embodiment of this disclosure.

FIG. 6 shows aspects of waveguide 50 in greater detail. Waveguide 50 has a front face 52 and a back face 54. The waveguide includes input grating 56, fold grating 58, and output grating 60. The input grating is configured to receive emission from laser 44 and to couple the emission into the waveguide, where it propagates by total internal reflection from the front and back faces. The fold grating is configured to expand the emission transverse to its direction of propagation. The output grating is configured to release the emission at uniform intensity over a portion of its propagation path, in order to uniformly illuminate image-forming array 24.

Accordingly, waveguide 50 is configured to confine the light from a light emitter and to release that light through output grating 60. In one embodiment, the light is uniformly released by diffraction from the output grating. Thus, each of the waveguides included in the light source may have gratings particularly configured to diffract emission from red-emitting laser 40, green-emitting laser 42, or blue-emitting laser 44. The output grating may be configured to diffract the propagating light relatively weakly at the end nearest the light emitter, and more strongly at greater distances from the light emitter. Thus, a gradual change in the diffraction efficiency of the output grating may be used to compensate for the decreasing intensity of the light propagating through the waveguide. In embodiments that include a plurality of parallel, stacked waveguides, the waveguides may be stacked such that the output gratings of each waveguide overlay, so that light from a plurality of light emitters may sequentially or simultaneously illuminate image-forming array 24.

In some embodiments, each of the gratings referred to herein may be a Bragg grating. In a more particular embodiment, each Bragg grating may include an electrically polarizable liquid crystal dispersion. Specifically, a Bragg hologram may be recorded in a nanocomposite material arranged in an interference pattern of two, intersecting beams of light. During recording, the nanocomposite precursor undergoes phase separation, creating regions densely populated by liquid-crystal micro-droplets, interspersed by regions of clear photopolymer. The modulation of the regions tracks the interference pattern of the intersecting light beams, resulting in a grating with very high diffraction efficiency. However, when a voltage is applied across the structure—via transparent indium-tin oxide (ITO) electrodes, for example—the entrapped liquid crystal is re-oriented, thereby reducing the refractive-index modulation of the grating. In this state, the diffraction efficiency falls to very low levels, effectively masking the grating.

In the embodiment of FIG. 6, therefore, front face 52 and back face 54 of waveguide 50 may support ITO electrodes on either side of output grating 60. These electrodes may be coupled to contacts 62. A voltage applied to the contacts may be used to polarize the included liquid crystal of the output grating, thereby switching it from an active, diffractive state to a passive, transparent state. The grating may be maintained in the passive state except during the firing of the laser whose emission it is configured to diffract. In this manner, the output gratings may diffract only one color of light and remain transparent to the other two colors, which minimizes stray reflections and other unwanted optical effects.

Despite the advantages of a stacked arrangement of waveguides with switchable Bragg gratings, it will be understood that this particular configuration is by no means necessary. In other embodiments, a stacked arrangement of waveguides with static Bragg gratings may be used. In still other embodiments, the light source may include only one waveguide. This waveguide may receive light from a white-light emitter—e.g., a white LED or ensemble of non-lasing color LEDs—and release the light at uniform intensity from a surface-relief type grating formed on the front or back surface of the waveguide. The surface-relief type grating may comprise a random distribution of scattering centers or microscale refractive structures, for example. In yet other embodiments, the light source may include red-, green- and blue-emitting LED's modulated in a color-sequential mode and a single waveguide. The output grating of the waveguide may include suitable microstructures to extract the light and to illuminate the image-forming array. In this embodiment, a polarizing beamsplitter may be arranged between the waveguide and the image-forming array.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:
1. An imaging panel comprising:
first, second, and third emitters configured to emit sequentially, the first emitter configured to emit in a first wavelength band, the second emitter configured to emit in a second wavelength band, the third emitter configured to emit in a third wavelength band;

a first waveguide having a first grating electronically switchable between a passive transparent state and an active diffractive state, the first waveguide configured to diffract light from the first emitter when the first emitter is fired and to remain in the passive transparent state when the second or third emitter is fired;

a second waveguide having a second grating electronically switchable between a passive transparent state and an active diffractive state, the second waveguide configured to diffract light from the second emitter when the second emitter is fired and to remain in the passive transparent state when the first or third emitter is fired;

a third waveguide having a third grating electronically switchable between a passive transparent state and an active diffractive state, the third waveguide configured to diffract light from the third emitter when the third emitter is fired and to remain in the passive transparent state when the first or second emitter is fired;

a reflective image-forming array configured to form a display image using light from the first, second, and third waveguides and to reflect the display image back through the first, second, and third waveguides; and a freeform-prism eyepiece configured to receive the display image and to present the display image for viewing, together with an external image transmitted through the freeform-prism eyepiece.

2. The imaging panel of claim 1, wherein each of the first, second, and third gratings is a Bragg grating.

3. The imaging panel of claim 1, wherein each of the first, second, and third gratings is a surface-relief type grating.

4. The imaging panel of claim 1, wherein each of the first, second, and third waveguides includes:
    an input grating configured to receive emission from its corresponding emitter and to couple the emission into the waveguide;
    a fold grating configured to expand the emission transverse to its direction of propagation; and
    an output grating configured to release the emission at uniform intensity over a portion of its propagation path.

5. The imaging panel of claim 4, wherein the first waveguide, the second waveguide, and the third waveguide are stacked such that the output gratings of each waveguide overlay.

6. The imaging panel of claim 4, wherein the combined thickness of the first waveguide, the second waveguide, and the third waveguide is one millimeter or less.

7. The imaging panel of claim 1, wherein each of the first, second, and third emitters is a laser.

8. The imaging panel of claim 1, wherein each of the first, second, and third emitters is a non-lasing light-emitting diode.

9. The imaging panel of claim 1, wherein each of the first, second, and third gratings is configured to uniformly illuminate the reflective image-forming array.

10. The imaging panel of claim 1, wherein each of the first, second, and third waveguides are arranged parallel to and stacked upon the reflective image-forming array.

11. The imaging panel of claim 1, wherein the first wavelength band is a red wavelength band, the second wavelength band is a green wavelength band, and the third wavelength band is a blue wavelength band.

12. The imaging panel of claim 1, wherein the reflective image-forming array is a liquid-crystal on silicon (LCOS) array.

13. The imaging panel of claim 1, wherein the reflective image-forming array is a digital micromirror array.

14. The imaging panel of claim 1, wherein each of the first, second, and third waveguides is configured to confine the light from its respective emitter and to release the light through its respective grating.

15. The imaging panel of claim 1, wherein each of the first, second, and third waveguides is substantially transparent to the display image reflected therethrough.

16. A head-mounted display device comprising:
    first, second, and third emitters configured to emit sequentially, the first emitter configured to emit in a first wavelength band, the second emitter configured to emit in a second wavelength band, the third emitter configured to emit in a third wavelength band;
    a first waveguide having a grating electronically switchable between a passive transparent state and an active diffractive state, the first waveguide configured to diffract light from the first emitter when the first emitter is fired and to remain in the passive transparent state when the second or third emitter is fired;
    a second waveguide having a grating electronically switchable between a passive transparent state and an active diffractive state, the second waveguide configured to diffract light from the second emitter when the second emitter is fired and to remain in the passive transparent state when the first or third emitter is fired;
    a third waveguide having a grating electronically switchable between a passive transparent state and an active diffractive state, the third waveguide configured to diffract light from the third emitter when the third emitter is fired and to remain in the passive transparent state when the first or second emitter is fired;
    a reflective image-forming array configured to form a display image using light from the first waveguide, the second waveguide, and the third waveguide and to reflect the display image back through the first waveguide, the second waveguide, and the third waveguide;
    a freeform-prism eyepiece configured to receive the display image and to present the display image for viewing, together with an external image transmitted through the eyepiece; and
    a controller configured to provide control signals to the reflective image-forming array, the control signals configured to cause the reflective image-forming array to form the display image.

17. The head-mounted display device of claim 16, wherein the external image originates from real-world imagery external to the head-mounted display device.

18. The head-mounted display device of claim 16, wherein the controller is further configured to control firing of the first, second, and third emitters.

19. An imaging panel comprising:
    a red-emitting laser;
    a green-emitting laser;
    a blue-emitting laser, the red-emitting laser, green-emitting laser, and blue emitting laser configured to emit sequentially;
    a first waveguide having a Bragg grating electronically switchable between a passive transparent state and an active diffractive state, the first waveguide configured to diffract light from the red-emitting laser when the red-emitting laser is fired and to remain in the passive transparent state when the green-emitting laser or the blue-emitting laser is fired;

a second waveguide having a Bragg grating electronically switchable between a passive transparent state and an active diffractive state, the second waveguide configured to diffract light from the green-emitting laser when the green-emitting laser is fired and to remain in the passive transparent state when the red-emitting laser or the blue-emitting laser is fired;

a third waveguide having a Bragg grating electronically switchable between a passive transparent state and an active diffractive state, the third waveguide configured to diffract light from the blue-emitting laser when the blue-emitting laser is fired and to remain in the passive transparent state when the red-emitting laser or the green-emitting laser is fired;

a reflective liquid-crystal-on-silicon array configured to form a display image using light from the first waveguide, the second waveguide, and the third waveguide and to reflect the display image back through the first waveguide, the second waveguide, and the third waveguide; and a freeform-prism eyepiece configured to receive the display image and to present the display image for viewing, together with an external image transmitted through the freeform-prism eyepiece.

20. The imaging panel of claim 19, wherein each Bragg grating includes a liquid-crystal dispersion.

* * * * *